(12) United States Patent
Sugawara

(10) Patent No.: US 6,617,066 B2
(45) Date of Patent: Sep. 9, 2003

(54) FUEL CELL POWER GENERATION SYSTEM

(75) Inventor: Tatsuya Sugawara, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/772,121

(22) Filed: Jan. 26, 2001

(65) Prior Publication Data

US 2001/0031386 A1 Oct. 18, 2001

(30) Foreign Application Priority Data

Jan. 28, 2000 (JP) ........................................ 2000-024816

(51) Int. Cl.[7] ............................. H01M 8/04; H01M 8/06
(52) U.S. Cl. ............................... 429/17; 429/19; 429/22
(58) Field of Search .............................. 429/19, 20, 22, 429/23, 17

(56) References Cited

U.S. PATENT DOCUMENTS 5,928,805 A * 7/1999 Singh et al. ............... 429/19 X
6,383,670 B1 * 5/2002 Edlund et al. ................. 429/20
6,443,717 B1 * 9/2002 Barber ....................... 429/22 X

FOREIGN PATENT DOCUMENTS

| JP | 57-205972 | * 12/1982 | ............ H01M/8/06 |
| JP | 61-218073 | * 9/1986 | ............ H01M/8/06 |
| JP | 6-333584 | 12/1994 | |

* cited by examiner

Primary Examiner—Stephen Kalafut
(74) Attorney, Agent, or Firm—Lahive & Cockfield, LLP

(57) ABSTRACT

A fuel cell power generation system comprising a reformer generating a hydrogen from base fuel to supply a fuel cell with the hydrogen, and a hydrogen reservoir connected to a first supply conduit between the reformer and the fuel cell through a second supply conduit, for storing hydrogen from the reformer as fuel cell assisting hydrogen. A distributing valve for distributing hydrogen from the reformer to the fuel cell side and the hydrogen reservoir side is provided at a connecting portion of the first and second supply conduits. The distributing valve is controlled to satisfy the amount of hydrogen required for the fuel cell and, thus, to supply the hydrogen reservoir with remaining hydrogen. This always satisfies the amount of the hydrogen required for the fuel cell corresponding to the fuel cell operation state.

11 Claims, 3 Drawing Sheets

FUEL CELL POWER GENERATION SYSTEM

RELATED APPLICATIONS

This application claims priority to Japanese Patent Application No. 24816/2000, filed on Jan. 28, 2000 in Japan. The contents of the aforementioned application are hereby incorporated by reference.

BACKGROUND OF THE INVENTION

1. Field of the Invention

The present invention relates to a fuel cell power generation system and, in particular, to a fuel cell power generation system provided with a reformer generating hydrogen from a base fuel such as alcohol, gasoline or the like so as to supply hydrogen to a fuel cell.

2. Description of the Related Art

Previously, the present Assignee developed, as a system that can compensate a delay in the response of a reformer, one provided with a hydrogen reservoir for storing hydrogen from the reformer as fuel cell assisting hydrogen.

However, in this system, when hydrogen is to be stored in the hydrogen reservoir, all hydrogen from the reformer flows through the hydrogen reservoir and hydrogen which is not stored in this hydrogen reservoir is supplied to the fuel cell. Therefore, there was a possibility that the hydrogen supply amount to the fuel cell may not meet with the amount of the hydrogen required for the fuel cell corresponding to the fuel cell operation state.

SUMMARY OF THE INVENTION

It is an object of the present invention to provide a fuel cell power generation system wherein a fuel cell is supplied with hydrogen by priority, and thus the system can always meet with the amount of hydrogen required for the fuel cell corresponding to the fuel cell operation state.

In order to achieve the above object, the present invention provides a fuel cell power generation system comprising a reformer generating hydrogen from a base fuel to supply a fuel cell with hydrogen, and a hydrogen reservoir connected to a first supply conduit between the reformer and the fuel cell through a second supply conduit, for storing hydrogen from the reformer as assisting hydrogen for the fuel cell, wherein a distributing valve for distributing hydrogen from the reformer to the fuel cell side and the hydrogen reservoir side is provided at a connecting portion of the first and second supply conduits, and the distributing valve is controlled to satisfy an amount of the hydrogen required for the fuel cell and, thus, to supply the hydrogen reservoir with remaining hydrogen.

According to the adoption of the aforementioned system, the hydrogen supply to the fuel cell is carried out by priority over the hydrogen supply to the reservoir, thereby satisfying always the amount of the hydrogen required for the fuel cell corresponding to the fuel cell operation state.

The aforementioned objects and other objects, features and advantages according to the present invention will be understood more obviously by reading the following description of the preferred embodiment referring to the attached drawings.

DESCRIPTION OF THE PREFERRED EMBODIMENT

Figure 1:
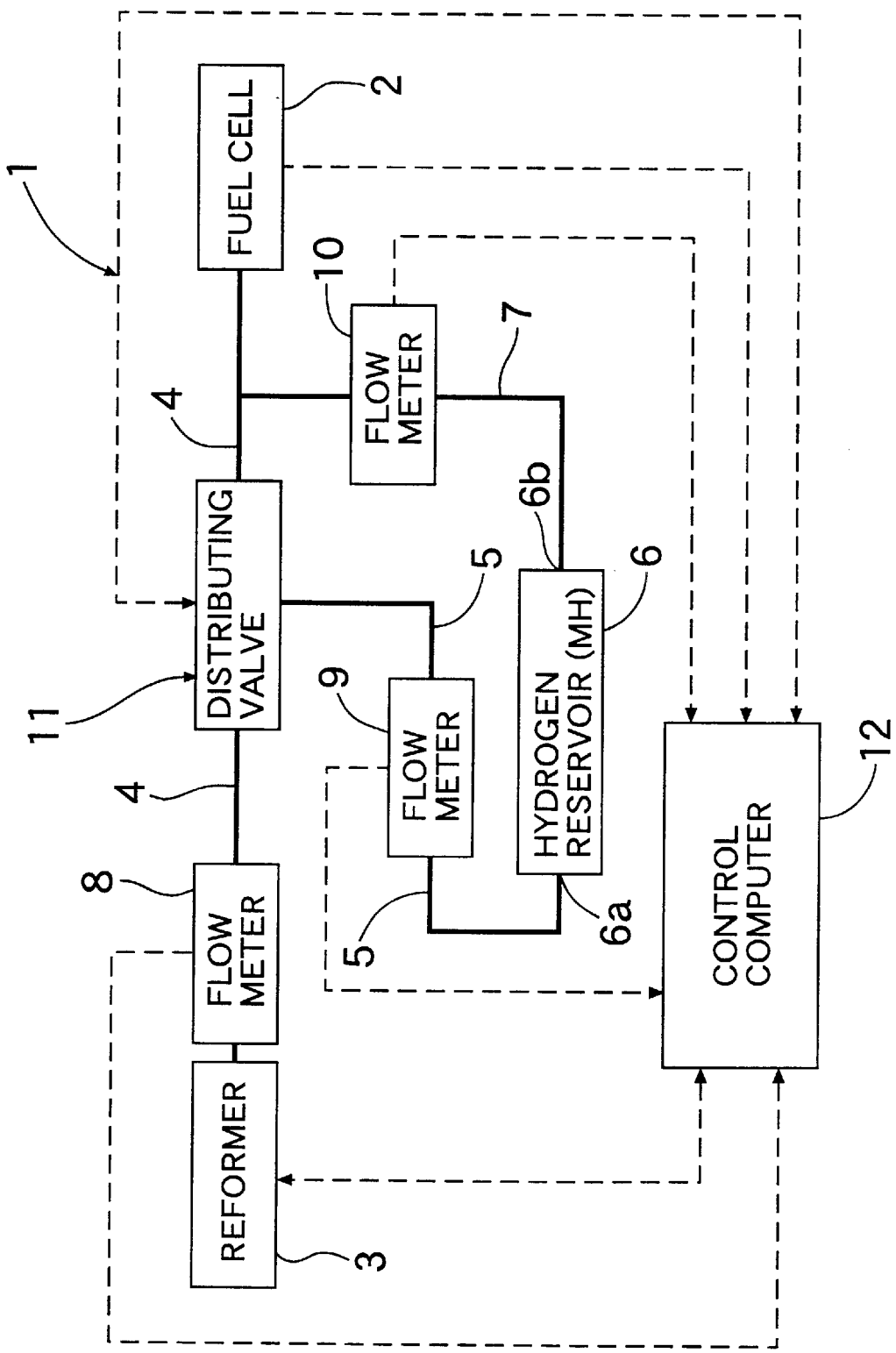
FIG. 1 is a view explaining a fuel cell power generation system.

A fuel cell power generation system 1 shown in FIG. 1 is loaded on an electric automobile using a fuel cell 2 as a power source.

In the fuel cell power generation system 1, a reformer 3 generates reformed gas containing mainly hydrogen from a base fuel such as alcohol, gasoline or the like. The reformer 3 is connected to the fuel cell 2 through a first supply conduit 4. A hydrogen reservoir 6 is of a through type having an inlet 6a and an outlet 6b which are independent of each other. The inlet 6a is connected to an intermediate portion of the first supply conduit 4 through a second supply conduit 5, while the outlet 6b is connected to a portion of the first supply conduit 4 in the proximity of the fuel cell 2 through a discharge duct 7, namely connected to a downstream side of the connecting portion of the second supply conduit 5. The hydrogen reservoir 6 stores hydrogen from the reformer 3 as assisting hydrogen for the fuel cell, and is filled with hydrogen occlusion alloy MH (for instance, $LaNi_5$ base alloys) which is a hydrogen occlusion material. A flow meter 8 detecting the generated hydrogen amount of the reformer 3 is fitted in the proximity of the first supply conduit 4, namely an upstream side of the connecting portion of the second supply conduit 5. In addition, flow meters 9, 10 detecting the hydrogen storage amount of the hydrogen reservoir 6 are fitted to the second supply conduit 5 and a discharge conduit 7.

A distributing valve 8 for distributing hydrogen from the reformer 3 to the fuel cell 2 side and the hydrogen reservoir 6 side is provided at a connecting portion of the first and second supply conduits 4, 5.

In the fuel cell power generation system 1, signals are input to a control computer 12 from respective flow meters 8, 9, 10. The reformer 3, fuel cell 2 and distributing valve 11 are controlled by the control computer 12 based on these signals or the like.

In the above arrangement, when the fuel cell 2 starts up, hydrogen stored in the hydrogen reservoir 6 is discharged and delivered to the fuel cell 2, to start its operation. During the operation, the reformer 3 starts the operation thereof to generate reformed gas. Before the reformer 3 attains its steady state, when the reformed gas in which the amount of hydrogen is increased is supplied to the fuel cell 2, the second supply conduit 5 is closed by the distributing valve 11 and at the same time, the amount of hydrogen discharged from the hydrogen reservoir 6 is reduced in accordance with the increase in the amount of hydrogen in the reformed gas. On the other hand, when the amount of hydrogen in the reformed gas is decreased after it was increased, the amount of hydrogen discharged from the hydrogen reservoir 6 is increased. After the reformer 3 attains the steady state, hydrogen discharged from the hydrogen reservoir 6 is decreased. Reformed gas containing mainly hydrogen, generated by the reformer 3, is supplied to the fuel cell 2 by closing the second supply conduit 5 by the distributing valve 11, thus its operation is sustained.

Figure 2:
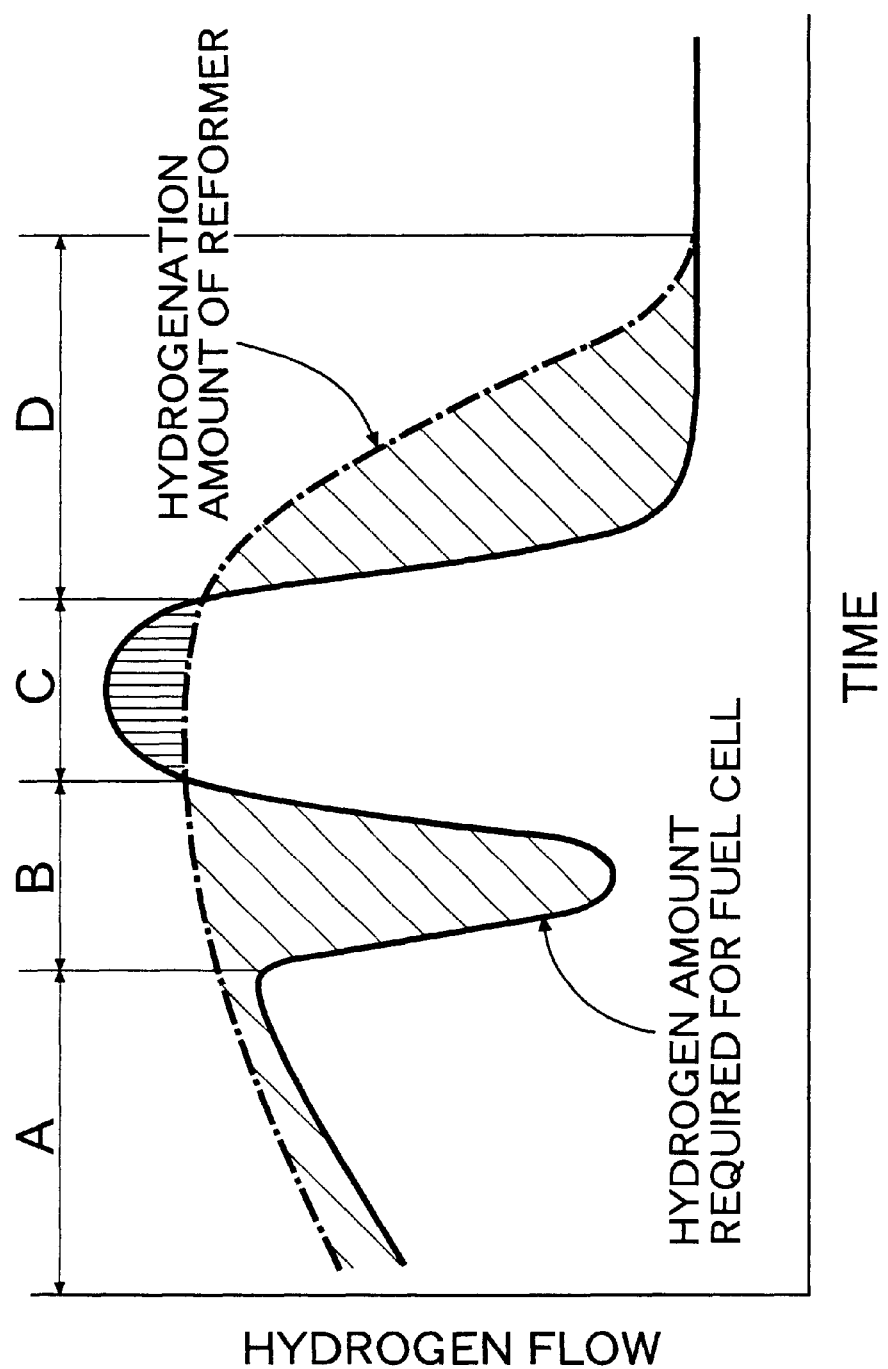
FIG. 2 is a graph showing the relationship between time and hydrogen flow.

As shown by the range A in FIG. 2, when the amount of the hydrogen required for the fuel cell 2 is near the amount of the hydrogen generation of the reformer 3 (for instance, during warming acceleration), hydrogen from the reformer 3 is distributed by the distributing valve 11 so that the hydrogen amount to the fuel cell 2 becomes larger than the hydrogen amount to the hydrogen reservoir 6. Hydrogen supplied to the hydrogen reservoir 6 is not totally stored there, but hydrogen which is not stored is supplied to the fuel cell 2 through the hydrogen reservoir 6.

As shown by the range B in FIG. 2, if the amount of hydrogen required for the fuel cell 2 is excessively less than the amount of the hydrogen generation amount of the reformer 3 (for instance, during deceleration), hydrogen from the reformer 3 is distributed by the distributing valve 11 so that the hydrogen amount to the fuel cell 2 becomes smaller than the hydrogen amount to the hydrogen reservoir 6.

As shown by the range C in FIG. 2, when the amount of the hydrogen required for the fuel cell 2 is higher than that of the hydrogen generation amount of the reformer 3 (for instance, during sudden acceleration and before the reformer 3 attains the stationary state or the like), the second supply conduit 5 is closed by the distributing valve 11 to supply the fuel cell 2 with all hydrogen from the reformer 3, and at the same time, the fuel cell 2 is supplied with hydrogen from the hydrogen reservoir 6, and this satisfies the amount of the hydrogen requirement for the fuel cell 2.

As shown by the range D in FIG. 2, if the amount of the hydrogen required for the fuel cell 2 decreases to the minimum (for instance, during idling), surplus hydrogen generates due to the delay in the response of the reformer 3. In this case, the downstream of the distributing valve 11 of the first supply conduit 4 is closed by the distributing valve 11, to supply the hydrogen reservoir 6 with all hydrogen from the reformer 3, this hydrogen is stored in the hydrogen reservoir 6 and, at the same time, the fuel cell 2 is supplied with the excess of hydrogen. Thereafter, when the hydrogenation amount generated from the reformer 3 decreases to the amount of hydrogen required for the fuel cell 2, the second supply conduit 5 is closed by the distributing valve 11, to supply the fuel cell 2 with whole hydrogen from the reformer 3.

When the hydrogen storage amount in the hydrogen reservoir 6 attains full state, this full state is detected by the integration value difference between the flow meter 9 of the second supply conduit 5 and the flow meter 10 of the discharge conduit 7. In this case, the second supply conduit 5 is closed by the distributing valve 11.

Figure 3:
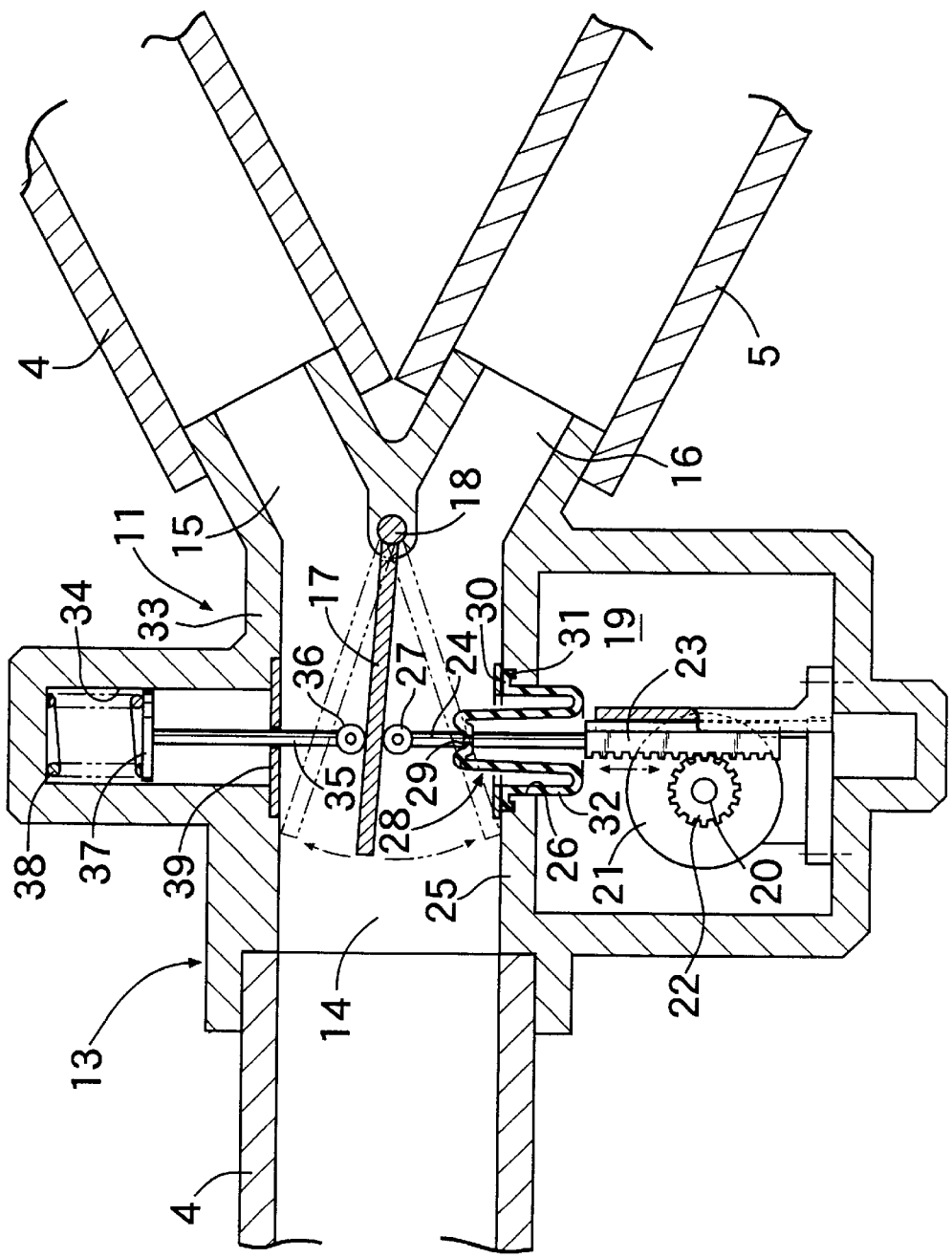
FIG. 3 is a longitudinal section showing the outline of a distributing valve.

As explicitly shown in FIG. 3, the distributing valve 11 has a valve box 13, and a main circulation hole 14 of square section and two branch circulation holes 15, 16 branching upward and downward from this main circulation hole 14 are formed in the valve box 13. An inlet side of the main circulation hole 14 communicates with a terminal end of the upstream side half of the first supply conduit 4, while the upper branch circulation hole 15 communicates with a terminal end of the downstream side half of the first supply conduit 4. The lower branch circulation hole 16 communicates with an inlet side of the second supply conduit 5.

A square flat plate shape valve member 17 is disposed in the main circulation hole 14, a portion situated at the downstream end of the main circulation hole 14 of the valve member 17 is pivotally supported by the branching section of the valve box 13 through a horizontal pin 18, allowing the valve member 17 to swing upward and downward. The valve box 13 has a power chamber 19 in the lower part thereof, and the power chamber 19 houses therein a reversible motor 21 having a horizontal driving shaft 20, a pinion 22 attached to the driving shaft 20 and a rack 23 meshing with this pinion 22. From an upper end of the rack 23, a driving rod 24 passes through a through hole 26 formed in a ceiling wall 25 of the power chamber 19, comes into the main circulation hole 14, and a roller 27 located at an upper end thereof makes contact with a lower face of the valve member 17. The through hole 26 is sealed with a bellowphragm (bowler hat shaped rubber diaphragm) 28 as a seal member. Namely, an inner circumferential bead 29 around the through hole situated at the top of the bellowphragm 28 is fitted to the driving rod 24, while an outer circumferential bead 31 around an outer periphery of a flange 30 is press fitted around the through hole 26 in the main circulation hole 14. A cylinder section 32 is formed double by folding back, and rolling of this double portion secures the stroke of the driving rod 24. Metal diaphragm or other various types are used as seal members.

In the upper wall 33 of the valve box 13, a concave section 34 opening downward is formed to be positioned on an extension of the axis of the driving rod 24, a follower rod 35 coaxial to the driving rod 24 extends downwards from the concave section 34, and a roller 36 existing at the lower end thereof comes into contact with the upper face of the valve member 17. A compression spring 38 is disposed between a spring base 37 at an upper end of the follower rod 35 and an inner face of the ceiling wall of the concave section 34, and its spring force retains the valve member 17 between both rollers 27, 36 of the driving and follower rods 24, 35. A guide plate 39 for the follower rod 35 is attached to an opening of the concave section 34.

The valve box 13, valve member 17, driving and follower rods 24, 35 or the like are formed of anticorrosive metal (for instance, stainless steel), synthetic resin, or the like, while the compression spring 38 is made, for instance, of stainless steel.

In the distributing valve 11, when the driving rod 24 is moved upward via the pinion 22 and rack 23 by the normal driving of the reversible motor 21, the valve member 17 swings clockwise as viewed in FIG. 3 and, eventually, its tip end edge comes into contact with the upper wall 33. This blocks the supply of hydrogen (reformed gas) to the fuel cell 2, and all hydrogen from the reformer 3 is supplied to the hydrogen reservoir 6.

When the driving rod 24 is moved downward via the pinion 22 and rack 23 by the reverse driving of the reversible motor 21, the valve member 17 swings counter-clockwise as viewed in FIG. 3 and, eventually, its tip end edge comes into contact with the power chamber ceiling wall 25. This blocks the supply of hydrogen (reformed gas) to the hydrogen reservoir 6, and all hydrogen from the reformer 3 is supplied to the fuel cell 2.

In the distributing valve 11, when the valve member 17 is made to operate by a linearly moving driving rod 24, the seal structure between this driving rod 24 and the ceiling wall 25 is simplified, and improved in sealing. On the other hand, if the rollers 27, 36 disposed on the driving and follower rods 24, 35 are made to come into contact with the valve member 17, the linear motion of these rods 24, 35 can be converted easily and smoothly into the swing movement of the valve disc 17. Moreover, according to the distribution structure by the square flat plate shape valve member 17, a resistance against the hydrogen flow is low and, therefore, can reduce considerably the hydrogen pressure loss.

What is claimed is:

1. A fuel cell power generation system, comprising
   a fuel cell,
   a reformer for generating hydrogen from a base fuel, a through type hydrogen reservoir having an inlet and an outlet which are independent of each other, said reservoir housing a hydrogen occlusion material, a first supply conduit connecting said reformer to said fuel cell for supplying hydrogen generated by said reformer to said fuel cell, a second supply conduit connecting said inlet of said hydrogen reservoir to said first supply conduit at a first connection section for storing hydrogen generated by said reformer in said reservoir as assisting hydrogen for said fuel cell, a discharge duct connecting said outlet to said first supply conduit at a location downstream of said first connection section for supplying hydrogen not stored in said hydrogen reservoir to said fuel cell and for supplying said assisting hydrogen from said reservoir to said fuel cell, and a distributing valve provided at said first connection section of said first and second supply conduits for distributing hydrogen from said reformer to said fuel cell and to said hydrogen reservoir, said distributing valve being controlled to distribute to the fuel cell an amount of hydrogen required for operation of said fuel cell and, for distributing a remaining amount of hydrogen to the hydrogen reservoir.

2. A fuel cell power generation system according to claim 1, wherein when the amount of the hydrogen required for operation of said fuel cell is higher than the amount of hydrogen generated by said reformer, said second supply conduit is closed by said distributing valve to supply said fuel cell with all of the hydrogen from said reformer, and said fuel cell is supplied with hydrogen from said hydrogen reservoir.

3. A fuel cell power generation system according to claim 1, wherein said fuel cell power generation system is mounted on an electric automobile and when the electric automobile is in an idling state, the first supply conduit downstream of said first connection section is closed by said distributing valve to supply said hydrogen reservoir with all of the hydrogen from said reformer.

4. A fuel cell power generation system according to claim 2, wherein said fuel cell power generation system is mounted on an electric automobile and when the electric automobile is in an idling state, the first supply conduit downstream of said first connection section is closed by said distribution valve to supply said hydrogen reservoir with all of the hydrogen from said reformer.

5. A fuel cell power generation system according to claim 1, wherein said second supply conduit is closed by said distributing valve only when the amount of hydrogen required for generation of said fuel cell exceeds the amount of hydrogen generated by said reformer, so as to supply all of the hydrogen from said reformer to said fuel cell.

6. A fuel cell power generation system comprising a reformer for generating hydrogen from a base fuel to supply a fuel cell with hydrogen, and a hydrogen reservoir connected to a first supply conduit between said reformer and said fuel cell through a second supply conduit, for storing hydrogen from said reformer as assisting hydrogen for said fuel cell, wherein a distributing valve for distributing hydrogen from said reformer to said fuel cell and to said hydrogen reservoir is provided at a connecting section of said first and second supply conduits, and said distributing valve is controlled to satisfy an amount of the hydrogen required for operation of said fuel cell and to distribute at least a portion of the hydrogen from the reformer to said hydrogen reservoir other than when said assisting hydrogen is being supplied to said fuel cell.

7. A method of controlling hydrogen in a fuel cell system, comprising reforming a base fuel to generate hydrogen, storing at least a portion of said hydrogen in a hydrogen occlusion material disposed in a hydrogen reservoir, supplying if necessary at least a portion of said hydrogen to a fuel cell, and controlling an amount of said hydrogen supplied to each of said fuel cell and said hydrogen reservoir such that an amount of hydrogen required for operation of said fuel cell is supplied thereto, and any remaining amount of hydrogen is supplied to the hydrogen reservoir.

8. A method for supplying hydrogen to a fuel cell, comprising reforming a base fuel with a reformer to generate hydrogen, storing a selected amount of said hydrogen in a hydrogen reservoir, and, in a first mode of operation, supplying the hydrogen to a fuel cell from both of said reformer and said hydrogen reservoir, wherein said amount of hydrogen supplied to said fuel cell from said reservoir is inversely proportioned to the amount of hydrogen supplied to the fuel cell from the reformer.

9. A method according to claim 8, further comprising, in a second mode of operation, supplying the hydrogen to the fuel cell primarily from said reformer, and supplying an additional supplemental amount of hydrogen to said fuel cell from said hydrogen reservoir.

10. A method according to claim 9, further compromising storing in said hydrogen reservoir any hydrogen amount generated by said reformer in excess of the amount required for operation of said fuel cell.

11. In a fuel cell power generation system including a fuel cell, a reformer for generating hydrogen from a base fuel, and a hydrogen reservoir for storing hydrogen generated by the reformer as assisting hydrogen for the fuel cell, a distributing valve for distributing hydrogen from the reformer to the fuel cell and the hydrogen reservoir, the distributing valve comprising:

a valve box;

a main circulation aperture formed in the valve box and adapted for communication with the reformer;

a plurality of outlets formed in the valve box for communicating at least with the hydrogen reservoir and the fuel cell;

a valve member pivotably disposed in the main circulation aperture for selectively blocking one of said plurality of outlets; and a rod coupled at one end to the valve member, and a reversible motor coupled to an end of the rod opposite the valve member for moving the rod to control a position of the valve member.

* * * * *

UNITED STATES PATENT AND TRADEMARK OFFICE
CERTIFICATE OF CORRECTION

PATENT NO.    : 6,617,066 B2
DATED         : September 9, 2003
INVENTOR(S)   : Sugawara It is certified that error appears in the above-identified patent and that said Letters Patent is hereby corrected as shown below:

<u>Title page,</u>
Item [*] Notice, replace "by 0 days" with -- by 109 days --.

Signed and Sealed this

Twenty-sixth Day of October, 2004

JON W. DUDAS
*Director of the United States Patent and Trademark Office*

UNITED STATES PATENT AND TRADEMARK OFFICE
CERTIFICATE OF CORRECTION

PATENT NO.   : 6,617,066 B2
DATED        : September 9, 2003
INVENTOR(S)  : Sugawara It is certified that error appears in the above-identified patent and that said Letters Patent is hereby corrected as shown below:

Title page,
Item [*] Notice, delete the phrase "by 0 days" and insert -- by 104 days --

Signed and Sealed this

Fifteenth Day of February, 2005

JON W. DUDAS
*Director of the United States Patent and Trademark Office*